Nov. 23, 1937. R. H. DRAEGER 2,099,682
PAGE FINDER
Filed Feb. 24, 1937 3 Sheets—Sheet 1

INVENTOR.
RUPERT H. DRAEGER.
BY Robert A. Lavender
ATTORNEY

Nov. 23, 1937.  R. H. DRAEGER  2,099,682
PAGE FINDER
Filed Feb. 24, 1937   3 Sheets-Sheet 2

INVENTOR.
RUPERT H. DRAEGER.
BY
ATTORNEY.

Nov. 23, 1937.  R. H. DRAEGER  2,099,682
PAGE FINDER
Filed Feb. 24, 1937  3 Sheets-Sheet 3

INVENTOR.
RUPERT H. DRAEGER.
BY
ATTORNEY.

Patented Nov. 23, 1937

2,099,682

UNITED STATES PATENT OFFICE 2,099,682

PAGE FINDER

Rupert H. Draeger, United States Navy

Application February 24, 1937, Serial No. 127,504

22 Claims. (Cl. 40—53)

(Granted under the act of March 3, 1883, as amended April 30, 1928; 370 O. G. 757)

This invention relates to page finders and more especially to page finders of a type that is adapted to be used in connection with motor driven reading machines. One of such reading machines has been described in my copending patent application Serial No. 100,239 filed September 11, 1936, on a Reading machine, and is being used in the present specification as an example for illustrating the page finder that forms the subject matter of this invention. It is, however, to be understood, that this page finder may be used in connection with any other suitable reading or tape carrying machine.

The material for such reading machines usually is photographed on suitable strips, as for instance sensitized film or paper, the length of the strips being immaterial. The images of the pages of a book or a series of documents or the like are arranged on the strip in consecutive order and may be provided with index numbers corresponding to the numbers on the pages of the book or the serial numbers of the documents.

To find the image of a particular page or document and position that portion of the film strip carrying that image, so that it may be examined or copied, would involve considerable manipulation of the reading machine, especially if the image occupies a relatively small area on a very long film strip. Reading machines are equipped with a mechanism to run a strip therethrough and this mechanism is commonly driven by a motor. A device is then provided to stop readily, promptly and as desired, the motor and all parts set in motion thereby.

While the present invention is particularly applicable to page finders such as herein disclosed, the invention is broadly applicable to devices for locating a desired portion of a flexible material, e. g., a coiled tape. According to the present invention, when this flexible material is moved, for instance, by being unwound under the control of a motor which is operable at varying speeds, then in order to insure the moving or unwinding of a predetermined length of material, automatic means are provided whereby before the complete predetermined length of material has been unwound or otherwise moved, the speed of the motor is changed, e. g., reduced.

The main object of the present invention is to provide a page finder that will stop the motor, e. g. by bridging the motor circuit and thereby permitting the stop mechanism of the motor driven reading machine to function at a time predetermined by a relation between the movement of the film strip through the reading machine, the location of the desired area on the strip and the index or "page number" of this area as set up on selectors, e. g. page finder dials.

Another object of this invention is to provide a page finder, in which the index number of any page, document or the like to be examined may manually be set up so that it is plainly visible.

Another object of the invention is to provide a page finder adapted to be used with a reading machine and having two sets of electric contacts, one set being adapted to be manually adjusted to desired positions, and the other set being operable by the parts of the reading machine advancing the film strip therethrough.

A further object of this invention is to provide a page finder by means of which the speed of the motor driving the film advancing parts of a reading machine may be regulated.

Another object of this invention is to provide a page finder, by means of which the speed of a motor driving the film advancing parts of a reading machine may be regulated according to the number of frames of film to be passed through the reading machine before the desired image will be in position for examination.

Still a further object of this invention is to provide a page finder adapted to be used in connection with a reading machine and having two sets of electric contacts, one of which is adapted to be positioned manually in accordance with the index number of the image of any given film area or page to be examined, whereby the positioning of each contact of this set is being correctively influenced by the position of the contact corresponding to the next lower denomination of figures in the index number, so that, for instance, the position of the contact representing tens would be affected by the position of the contact representing units, and similarly the hundreds contact would be affected by the tens column contact, etc.

Another object of this invention is to provide a page finder adapted to be used with a reading machine and having two sets of electric contacts, one of which is adapted to be manually positioned in accordance with the index number of any image on the film strip to be examined, and the other is operable by parts of the reading machine controlling the advance of the film strip through said reading machine, whereby the corresponding contacts of the two sets representing a higher denomination in the index number will be closed permanently before the following lower denomination contact will be closed permanently.

A further object of this invention is to provide a page finder adapted to be used with a motor driven reading machine and having two sets of electric contacts, one set being adapted to be adjusted or positioned manually according to the index number of any image to be examined, and the other set being positioned by parts of the reading machine which control the advance of the film strip through said machine, whereby the corresponding contacts of the two sets will be in such relation to each other that the permanent closing of said contacts will occur in rotation, starting with the highest column contacts, and whereby resistances will be cut in or inserted into the motor circuit by the closing of certain of these contacts, so that the speed of the motor will be controllably reduced step by step.

Another object of this invention is to provide a page finder adapted to be used with a motor driven reading machine and having two sets of electric contacts, one of said sets being adapted to be positioned manually in accordance with the index number of any image to be examined, and the other set being positioned by the parts of the reading machine which control the advance of the film strip through said machine, the contacts in the two sets corresponding with each other and representing the different columns of figures in the index number being permanently closed successively, so that the higher denomination contacts will be permanently closed before the contacts of the lower denominations, the closing of the last contacts, the unit contacts, causing the motor circuit to be broken.

Another object of this invention is to provide a page finder adapted to be used with a reading machine and having two sets of indicator dials, by means of one of which an index number of an image may be set-up in the page finder; each of said index dials being provided with an electric contact and the corresponding individual contacts in the two sets being closed as each pair of corresponding dials indicates identical figures.

A further object of the invention is to provide a page finder adapted to be used in connection with a motor driven reading machine and having two sets of indicator dials, each individual dial being mechanically connected with an electric contact, the contacts of corresponding dials in the two sets being closed when said dials show identical figures, one set of dials being adapted to be manually set so that this set of dials will indicate the index number of any image to be examined, and the other set being operable by the parts of the reading machine which control the advance of the film strip through said machine.

A further object of the invention is to provide a page finder adapted to be used in connection with a motor driven reading machine and having a set of manually operable indicator dials adapted to be set to show the index number of an image to be examined, each dial being so connected with an electric contact that the contact will be positioned in accordance with the numeral showing on the corresponding dial, when said dial is being adjusted; a second set of electric contacts being provided to cooperate with the first mentioned contacts and being operable by the film advancing means of the reading machine, so that an electric circuit will be closed when all the corresponding contacts of the first and second sets are closed, whereby a relay or the like will be energized to cause the main circuit to be broken, deenergizing the motor and permitting the stop mechanism of the reading machine to function.

Other objects of this invention not specifically mentioned or enumerated may be easily ascertained and understood from the following description in connection with the accompanying drawings, forming a part thereof. It is, however, to be understood that the invention is not to be limited or restricted to the exact construction and formation shown in the drawings and described in the specification, but that such alterations and changes may be made without violating the spirit of the invention as fall within the scope of the claims appended thereto.

To a reading machine 10, a housing 11 of a page finder is fastened by means of bolts 12 extending through lugs or ears 13 on the page finder.

A shaft 14 journaled inside the reading machine extends through the abutting walls of the reading machine and the page finder, and a bevel gear 15 is mounted on the end of this shaft inside of the reading machine. This bevel gear meshes with a second bevel gear 16 mounted on the control shaft 17 of the reading machine, which is driven through a train of gears by the electric motor 18, actuating the reading machine.

On the end of shaft 14 located inside of the page finder housing there is mounted another bevel gear 19, which meshes with still another bevel gear 20 mounted on a shaft 21 extending lengthwise of the housing, and rotatably supported therein at 22 in the end wall 23 of the housing 11 and by a U-shaped bracket 24, fastened to the rear wall 25 of the housing. A collar 26 mounted on the shaft 21 against one of the shanks of the U-shaped bracket 24 and a bevel gear 27 mounted on the end of said shaft extending beyond said bracket secure said shaft against lengthwise movement. This bevel gear 27 meshes with a bevel gear 28 mounted on a vertical shaft 29 journaled in flanged bushings 30 inserted in the shanks of a second U-shaped bracket 31 mounted on the rear wall 25 of the housing 11. On the top end of this vertical shaft 29 a spur gear 32 is mounted and meshes with a second spur gear 33 on a second vertical shaft 34 journaled in a horizontal bearing plate 35 having flanges 36, by means of which it is fastened with bolts 37 to the end walls 23 and 38 respectively of the housing 11. On this second vertical shaft 34 an indicator dial 39 is mounted underneath the spur gear 33. This dial carries the numerals from 0 to 9 on its circumference at equally spaced intervals as shown at 40.

A pinion 41 is mounted on the vertical shaft 34 just above the horizontal bearing plate 35. A shoulder screw 42 screwed into the said bearing plate rotatably carries a spur gear 43, which meshes with the pinion 41, and a second pinion 44 is rigidly connected with the spur gear 43 so that the two will rotate uniformly and simultaneously. Another spur gear 45 is in mesh with the pinion 44 and is mounted on a third vertical shaft 46 journalled in the bearing plate 35. This shaft carries an indicator dial 47, which is identical with and arranged at the same level as the previously mentioned dial 39. The ratio of transmission in the train of gears connecting the two vertical shafts 34 and 46 is 1 to 10, so that the shaft 46 makes $\frac{1}{10}$ of a revolution for each full revolution of shaft 34.

Figure 1:
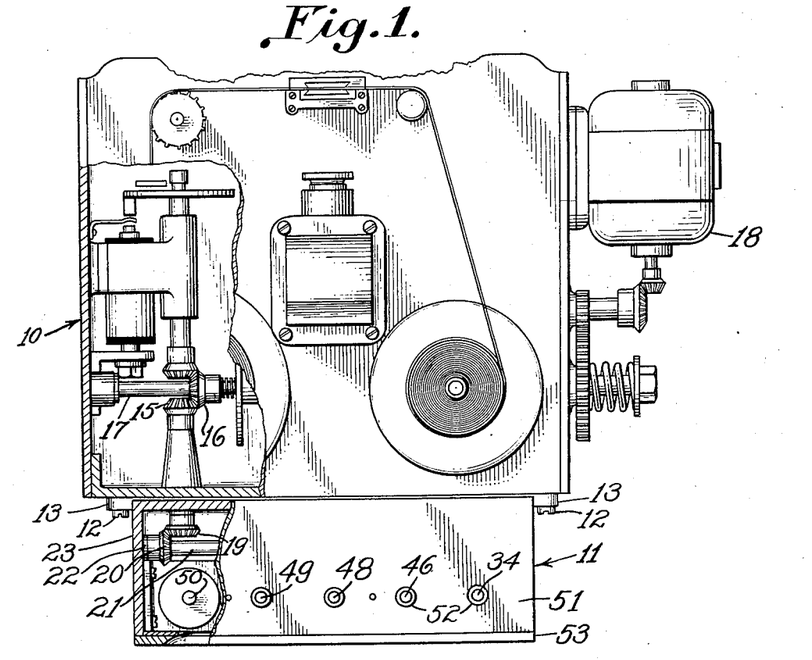
Fig. 1 is a top plan view of a page finder according to the present invention attached to a motor driven reading machine; said reading machine being shown in part, with the tops of the reading machine and the page finder partly broken away to show the driving connection between them.
Figure 2:
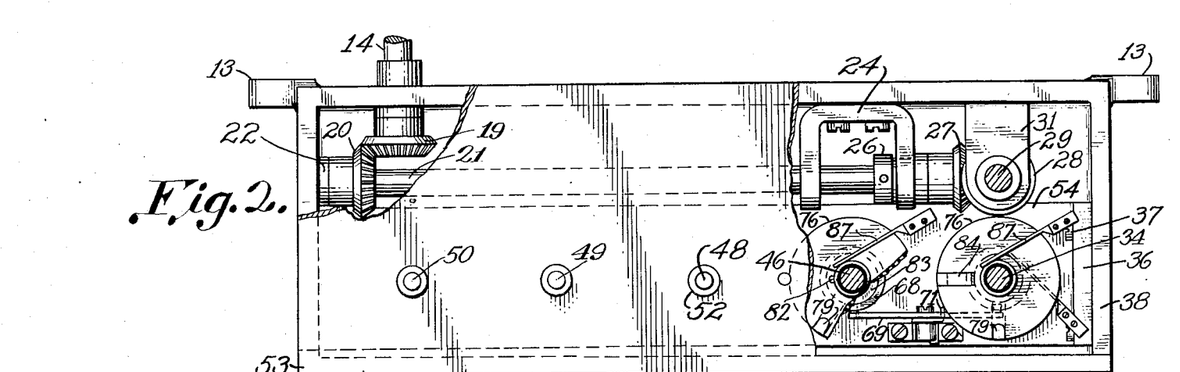
Fig. 2 is a sectional plan view taken on line 2—2 of Fig. 3.

To the left, in the drawings, of vertical shaft 46 three other vertical shafts 48, 49, and 50 respectively are journaled in the bearing plate 35. These, as well as the above mentioned shafts 29, 34, and 46, also are supported in the top wall 51 of the housing, as indicated at 52 in Figs. 1 and 2. The shafts 50, 49, 48 and 46 are connected with each other by means of trains of gears in the same manner and at the same ratio of transmission as described for the shafts 46 and 34, so that, the last shaft to the left in Fig. 2, that is, shaft 50 makes $\frac{1}{10}$ of a revolution for each 1000 revolutions of shaft 34. Each of these shafts 48, 49, and 50 is also equipped with indicator dials 39 and openings are arranged in the front wall 53 of the housing at the level of the dials so that the numerals on said dials can be read by the operator. These indicator dials show at all times the number of the page of the film in view, the indicator dials and page in view having been synchronized when the film was inserted in the reading machine.

A second horizontal bearing plate 54 is arranged in the housing 11 and is provided with end flanges 55 abutting the end walls 23 and 38. Bolts 56 hold this bearing plate 54 in place. Five vertical shafts 57, 58, 59, 60, and 61 are journaled through the bottom 61' of the housing 11 and the bearing plate 54. These shafts are arranged so that the axis of shaft 57 coincides with the axis of shaft 34, the axis of shaft 58 with that of shaft 46, the axis of shaft 59 with that of shaft 48, the axis of shaft 60 with the axis of shaft 49, and the axis of shaft 61 with that of shaft 50. The lower ends of the shafts 57, 58, 59, 60, and 61 extend below the bottom 61' of the housing 11 and on the end of each of these shafts one of knurled knobs 62 is fastened permitting each of these shafts to be manually rotated. A selector dial 63 is mounted on each of these shafts and all of these dials are located at the same level, between the bottom of the housing and the second horizontal bearing plate 54. These selector dials 63 are to be individually manually rotated by their respective knobs 62 and set at the page number of the desired page on the film to be found and viewed. The dials 63 are identical with the dials 39 and 47 with the exception that the under-edge of the rim of each of the dials 63 is provided with notches 64, one notch in line with each of the numerals on the circumference of said dials. Openings are provided in the front wall 53 of the housing so that the numerals on the dials 63 can be seen by the operator. Blade springs 65 are fastened to the bottom 61' of the housing 11 as indicated at 66, one spring adjacent each dial 63. Each blade spring is provided with a nose or projection 67 adapted to engage any one of the notches 64 in the corresponding selector dial 63 for the purpose of securing the said dial against accidental movement.

Figure 8:
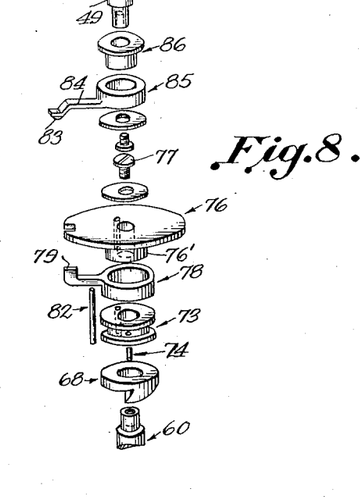
Fig. 8 is an exploded perspective view of some of the parts shown in Fig. 7.

The following mechanism, shown in the exploded view, Fig. 8, is provided to operate the motor speed control so that the motor will begin to slow down at about 99 pages before the selected page is reached, then further slow down at 9 pages before the selected page is reached, so that the motor will have had time to slow to the minimum speed and stop at the selected page without any harmful jar. The contact on the selector shafts is made adjustable by one-tenth of a revolution relative to the selector dial, and this rotation is controlled by the position of the shaft of the adjacent position. Without this mechanism, the slowing down period would vary from a maximum when a page number ending in 99 was to be selected, to zero when a page ending in 00 was to be selected. With this mechanism, as hereinafter set forth, the slowing down period is always the same, irrespective of the page to be selected.

On each of shafts 57, 58, 59 and 60 a cam 68 is mounted, and between each pair of adjacent shafts a lever 69 is arranged. Each of these levers is pivotally mounted on a bracket 70 fastened to the second bearing plate 54. A spring 71 on each of these brackets urges one end of the corresponding lever 69 into contact with the bottom or cam surface of the adjacent cam 68. Each of shafts 58, 59, 60 and 61 is provided with a spiral slot 72 extending upwardly and around $\frac{1}{10}$ of the circumference of the shaft. A sleeve 73 having top and bottom flanges is slidably mounted on each of these shafts, and a pin 74 extends inwardly from each of these sleeves and engages the slot 72. The other or free end of the lever 69 carries a roller 75 which engages the sleeve 73 between its flanges. When one of the shafts which protrude through the base 61' is adjusted by turning its knob 62, the lever 69 in contact with the cam 68 on that shaft will be pivoted on its bracket 70 causing the sleeve 73, which is engaged by the other end of that lever 69, to be moved upwardly or downwardly on its shaft and at the same time to impart a rotary movement to the shaft, through the engagement of the pin 74, on the sleeve 73, with the spiral slot 72 in the shaft. On the top end of each shaft 57, 58, 59, 60, and 61 a circular disc 76 is fastened by a screw 77. Each disc 76 has a hub 76' extending downwardly and surrounding the corresponding shaft. The discs and hubs are made of fiber or any other suitable insulating material. A copper ring 78 surrounds this hub and is insulated thereby from the shaft. A contact plate 79 is set into the insulating disc 76 and is electrically connected with the ring 78. Wiping contacts 80 are mounted on and insulated from the first bearing plate 35, as indicated at 81, and are adapted to be connected to electric conductors forming part of the circuit shown in Fig. 5. The other end of each of the wiping contacts 80 is in permanent gliding contact with the respective one of the rings 78, so that any current flowing in an electric conductor mentioned above will be led to the respective contact plate 79.

A pin 82 extends upwardly from the sleeve 73 through the hub 76' and the disc 76, so that it can move upwardly or downwardly with the sleeve and will transmit any rotary movement of said sleeve to the disc.

On each of the power driven shafts 34, 46, 48, 49, and 50 electric brushes 83 are mounted by means of arms 84 having sleeves 85 surrounding the respective shafts and insulated therefrom by bushings 86.

Figure 5:
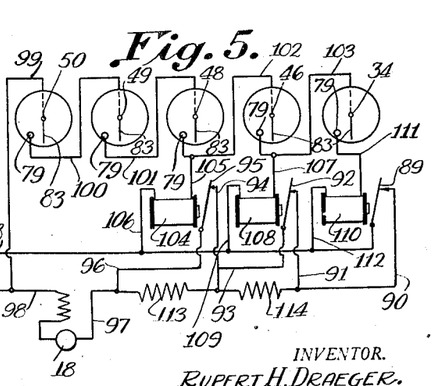
Fig. 5 is a schematic wiring diagram illustrating the electrical connections used in the page finder according to the present invention.
Figure 6:
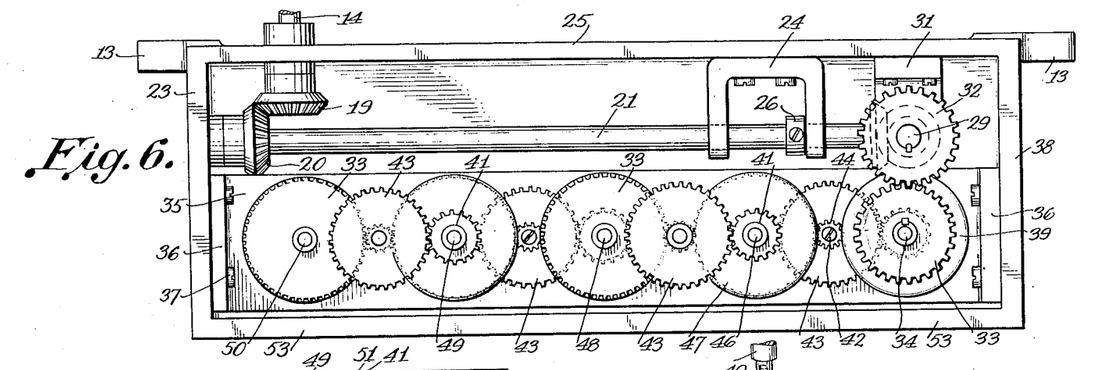
Fig. 6 is a top plan view of the page finder according to the present invention, the top of the page finder housing being removed.
Figure 7:
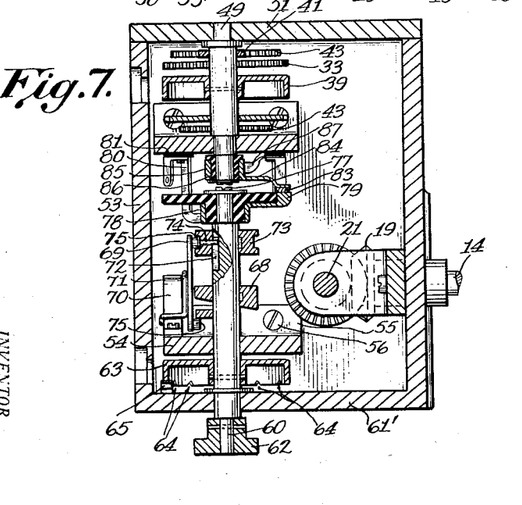
Fig. 7 is a sectional view taken on line 7—7 in Fig. 3.

Wiping contacts 87 are fastened to the first bearing plate 35 and insulated therefrom and each is adapted to be connected to an electric conductor also forming part of the circuit shown in Fig. 5. The other ends of these contacts 87 are in permanent wiping contact with the sleeves 85 so that the brushes 83 will be connected with the conductors which are not shown. Each of the brushes 83 is in permanent wiping contact with the insulation disc 76 corresponding thereto and will make contact at certain times with the contact plate 79 in said disc.

The electric circuit used in connection with the page finder of the present invention is schematically illustrated in Fig. 5.

The motor 18 is energized by the main line wire 88, through a relay armature 89, wires 90 and 91, relay armature 92, wires 93 and 94, relay armature 95, wires 96 and 97 and main line wire 98, when operating at maximum speed.

The brush 83 on shaft 50 is connected with the main line wire 98 over wire 99. This is done by connecting the wiping contact 87 adjacent shaft 50 to wire 99. The contact plate 79 on shaft 61 is connected with the brush 83 on shaft 49 by connecting the wiping contact 80 of shaft 61 with wiping contact 87 of shaft 49 by a wire 100. The contact plate 79 on shaft 60 is connected in the same manner to brush 83 on shaft 48 through wire 101; the contact plate 79 on shaft 59 is connected with the brush 83 on shaft 46 by means of wire 102 and the contact plate 79 on shaft 58 is connected with brush 83 on shaft 34 by wire 103.

The contact plate 79 on the "hundreds" selector shaft 59 is also connected with the winding of relay 104 by a wire 105 and this magnet is connected with the main line wire 88 through a wire 106. When this relay is energized it attracts the armature 95 and connects the motor circuit through resistance 113, thus slowing down the motor. A wire 107 also connects the contact plate 79 on the "tens" selector shaft 58 with relay winding 108 which in turn is connected with the main line wire 88 by a wire 109. The relay 108 is adapted to open the contact made by the relay armature 92 and connect the motor circuit through the additional resistance 114, further slowing down the motor. The contact plate 79 of the "units" selector shaft 57 is connected only to relay winding 110 by a wire 111 and this relay is connected to the main line wire 88 by a wire 112 and is adapted to open the contact made by relay armature 89 and break the motor circuit completely. Resistance 113 is connected between relay contact 95 and wire 94 and resistance 114 is connected between relay contact 92 and wire 91, i.e. each therefore being so placed as to be left in unshunted series with the motor when its respective relay contact is open as explained above.

Figure 3:
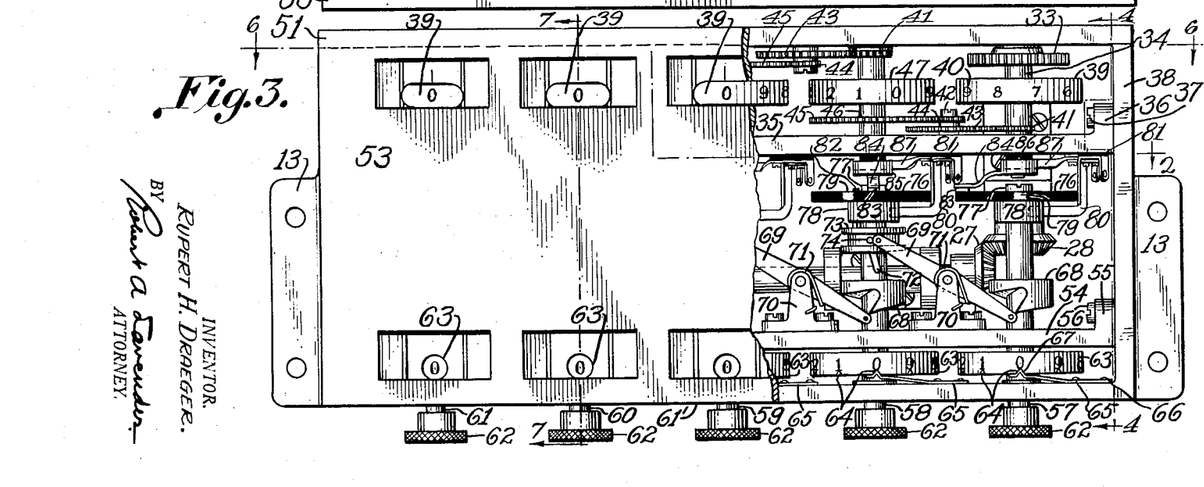
Fig. 3 is a front elevational view of the page finder, the front wall being partly broken away to show a part of the mechanism.
Figure 4:
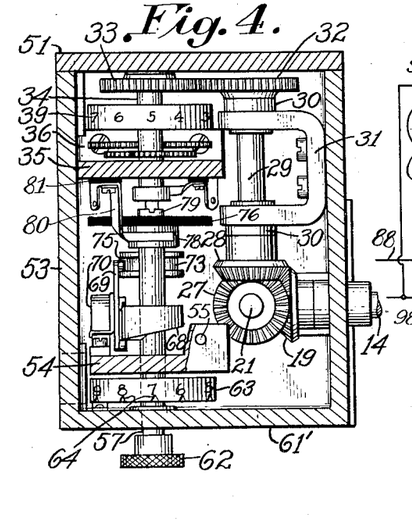
Fig. 4 is a sectional view taken on line 4—4 of Fig. 3.

The page finder of this invention operates as follows:

Assume that a certain page of a book, which has been photographed on a film is to be examined. The dials of the upper or indicator set in Fig. 3 are all set to 0; 00001 or the number of the first page on the particular spool of film to be inserted in the reading machine. Any desired number may be set up on these dials by operating the motor. If page 1 is on the outer end of the spool to be inserted in the machine it would be most convenient to synchronize the machine with the film by setting up 00001 on the upper dials and placing page 1 in the film gate of the reading machine. The page number of the page to be examined is known. The next step is to set up this number in the page finder. This is done by manipulating the knurled knobs 62 until the desired number is set up on the lower or selector dials 63 in Fig. 3. Suppose that the desired page is number 535; shaft 59, representing the "hundreds", is rotated until the numeral 5 appears on the dial mounted on this shaft. When this shaft 59 is rotated the cam 68 on this shaft is also rotated and thereby the adjacent lever 69, one end of which is contacting this cam, is pivoted, moving the sleeve 73 on the shaft 60, representing the "thousands", downwardly in relation to this shaft. This movement imparts a rotary movement to the said sleeve, as explained above. The shape of cam 68 is such as to move the sleeve over the full length of the groove or slot 72 in shaft 60, when the cam makes a full revolution, and that means that the sleeve will make $\frac{1}{10}$ of a revolution on its shaft.

It should be remembered that one of the objects of the invention is to reduce the speed of the motor at certain predetermined intervals, before the desired page is found. The intention is to run the film nine frames at slow speed before it is stopped definitely, and to run approximately 90 frames at a reduced speed, before it starts to run at slow speed. In order to obtain this result, the contact plates 79 on each shaft are positioned independently of its shaft and the dial thereon, so that the circuit may be closed a certain number of frames or pages before the corresponding dials in the two sets actually show the same numeral. This is done by the cam, lever and sleeve combination connecting the several shafts.

The correcting movement of the parts is such that the contact plates will be set as follows:

When the "hundreds" dial is set to read 0, the cam, lever and sleeve mechanism operated thereby will set the contact plate on the "thousands" shaft so that contact will be made 9/100 of a revolution ahead of time. If the "hundreds" dial is set to 1, the "thousands" contact is advanced 8/100 of a revolution, if the "hundreds" dial is set at 2 the "thousands" contact is advanced 7/100 of a revolution and so forth.

When, therefore, in the example mentioned above, the "hundreds" shaft is adjusted, so that the dial shows the numeral 5, the sleeve 73 on the "thousands" shaft is rotated imparting this movement by means of its upwardly extending pin 82 to the insulating disc 76 and the contact plate 79 therein, so that this contact is not longer in line with the 0 on the "thousands" dial but is moved 4/100 of a revolution toward the 9 on said dial. During this corrective adjustment of the contact on the "thousands" shaft 60 the dial on this shaft does not move, but is secured against movement by means of the projection 67 of the blade spring 65 engaging the notch 64 in the rim of the dial.

The next step is then to set the "tens" dial of the lower reader so that the numeral 3 will appear. This will affect the contact plate 79 on the "hundreds" shaft, through the cam, lever and sleeve mechanism, so that it will be moved ahead 6/100 of a revolution. That means that contact would not be made at 5, the numeral set up on the hundreds dial, but at 4.4.

Finally the unit dial is adjusted to show the numeral 5, which moves the contact on the "tens" shaft so that a circuit may be closed not at 3—showing on the dial—but at 2.6.

The contact plates 79 and the brushes 83 on the shafts are of such a width that a circuit, after being established, will stay closed for 9/100 of a revolution of each particular set of contacts.

The motor 18 is energized. This starts the film to travel through the reading machine 10 and the brushes 83 on the shafts, 34, 46, 48, 49, and 50 are set into rotary motion. This is caused by the rotary motion of said shafts, which are connected with each other and with the motor by means of the train of gears described above.

The transmission from the control shaft 17 of the reading machine to the unit dial of the upper or power driven set of indicator dials is such that for every frame or page on the film passing through the reading machine the "units" dial 39 makes 1/10 of a revolution, so that the number showing on the upper set of dials corresponds with or indicates the number of the frame in position for examination in the reading machine.

As described above, the unit dial of the hand operated set of dials stands at 5. When the upper or power driven "units" dial arrives at 5, the brush 33 of this dial will contact the plate 79 of the lower "units" dial, but since neither brush nor plate are energized, this contact will not exert any effect whatsoever.

The "10,000's" dials of both sets are at 0, so that the brush of the top and the plate of the lower dial are in contact; the "1000's" dials are also at 0 and brush and plate of these dials are also in contact.

As explained above, the contact plate of the "hundreds" dial of the manually adjusted set is at 4.4 while the dial proper shows the numeral 5. When frame 440 passes the film gate of the reading machine, the upper set of dials will read 00440. The brushes and plates of the "ten thousands", "thousands" and "hundreds" dials will then be in contact. Current from the main line wire 88 will then flow through wire 106, relay winding 104, wire 105, the plate and brush of the "hundreds" dials, wire 101, the plate and brush of the "thousands" dials, wire 100, the plate and brush of the "ten thousands" dials and wire 99 to main line wire 98. The relay 104 will thus be energized attracting armature 95 and opening the shunt around resistance 113, whereby the latter will be connected in series in the motor circuit.

The current energizing the motor will then flow from wire 88, through the contact made by the armature 89, wires 90 and 91, the contact made by the armature 92, wires 93 and 94, resistance 113, wire 97, motor 18 and to the main line wire 98. The motor 18 will now rotate at reduced speed.

The contact plate of the "tens" dial of the manually operated set stands at 2.6 as described above when the brush of the corresponding dial of the power driven set arrives at the point to contact this plate, the upper set of dials will read 00526, and frame 526 will be in the film gate of the reading machine. When the two sets are in this position, current will flow from the main line wire 88 through wire 109, relay winding 108, wire 107, the plate and brush of the "tens" dials, wire 102, the plate and brush of the "hundreds" dials, wire 101, the plate and brush of the "thousands" dials, wire 100, the plate and brush of the "ten thousands" dials, wire 99 to main line wire 98, energizing the relay 108. This relay attracts the armature 92 and cuts resistance 114 into the motor circuit. The motor is then fed by current from the main line wire 88, through the contact made by the armature 89, wire 90, resistance 114, resistance 113, wire 97, the motor and the main line wire 98, so that now two resistances are cut into the motor circuit thereby further reducing the speed of the motor. When finally the unit dials correspond with each other, so that both sets of dials read 00535, the relay 110 will be energized, whereby the contact made by the armature 89 will be opened, so that the motor 18 will be deenergized. At the same time the stop mechanism described in the above identified copending application will function, so that the entire device will stop at the predetermined page 535.

It will be seen, therefore that the device will operate at full speed until 440 frames have passed the film gate of the reading machine. Then the device will be operated at reduced speed for 86 frames, and the last 9 frames will be fed through the device at slow speed, making it possible to stop the mechanism at the predetermined frame without exposing film or mechanism to any undue jar or stress.

The invention described herein may be manufactured and used by or for the Government of the United States of America for governmental purposes without the payment of any royalties thereon or therefor.

Having thus described my invention, what I claim as new and desire to secure by Letters Patent is:

1. In a device for locating a desired portion of flexible material, a motor for moving said material, means for operating said motor at varying speeds, variably operable means for predetermining the length of material to be moved by said motor, and means automatically operated before the complete predetermined length of material has been moved for changing the speed of said motor.

2. In a device for locating and displaying a desired portion of a coiled tape, a motor for unwinding said tape, means for operating said motor at varying speeds, variably operable means for predetermining the length of tape to be unwound by said motor, and means automatically operated before the complete predetermined length of tape has been unwound for reducing the speed of said motor.

3. In a device for locating and displaying a desired portion of a coiled tape, a motor for unwinding said tape, means for operating said motor at varying speeds, variably operable means for predetermining the length of tape to be unwound by said motor, means automatically operated after a portion of said predetermined length of tape has been unwound for reducing the speed of said motor, and means automatically operated after an additional portion of said length of tape has been unwound for further reducing the speed of said motor.

4. In a device for locating and displaying a desired portion of a coiled tape, an electric motor for unwinding said tape, an energizing circuit for operating said motor, variably operable means for predetermining the length of tape to be unwound by said motor, an electrical resistance, and means automatically operated before the complete predetermined length of tape has been unwound for connecting said resistance in said energizing circuit.

5. In a device for locating and displaying a desired portion of a coiled tape, a motor for unwinding said tape, means for operating said motor at varying speeds, variably operable means for predetermining the length of tape to be unwound by said motor, and means automatically operated before the complete predetermined length of tape has been unwound for changing the speed of said motor.

6. In a device for locating and displaying a desired portion of a coiled tape, an electric motor for unwinding said tape, an energizing circuit for said motor, variably operable means for predetermining the length of tape to be unwound by said motor, an electrical resistance element, means automatically operated when a certain portion of said length has been unwound for connecting certain value of resistance in said circuit, and means automatically operated when an additional portion of said length is unwound for connecting additional resistance in said circuit.

7. In a page finder, a coil of record bearing tape, a motor for unwinding any desired length of tape to display the various records thereon, means for operating said motor at varying speeds, variably operable means for predetermining the length of tape to be unwound, means for starting said motor to operate at one speed to unwind a predetermined length of tape, and automatic means operable before the complete predetermined length of tape has been unwound for reducing the speed of said motor.

8. In a page finder, a coil of record bearing tape, a motor for unwinding any desired length of tape to display the various records thereon, means for operating said motor at varying speeds, variably operable means for predetermining the length of tape to be unwound, means for starting said motor to operate at one speed to unwind a predetermined length of tape, automatic means operable when a certain portion of said predetermined length has been unwound for reducing the speed of said motor, and automatic means operable when an additional portion of said predetermined length has been unwound for further reducing the speed of said motor.

9. In a page finder, a coil of tape, an electric motor for unwinding any desired length of tape to display the various portions thereof, an energizing circuit for operating said motor, variably operable means for predetermining the length of tape to be unwound, an electric resistance, and means automatically operated before the complete predetermined length of tape has been unwound for connecting said resistance in said energizing circuit.

10. In a page finder, a coil of tape, an electric motor for unwinding any desired length of tape to display the various portions thereof, variably operable means for predetermining the length of tape to be unwound, electrical resistance element, means automatically operated when a certain portion of said length has been unwound for connecting certain value of resistance in said circuit, and means automatically operated when an additional portion of said length is unwound for connecting additional resistance in said circuit.

11. A motor actuated page finder comprising a motor, an electric circuit for energizing said motor, and a second circuit connected therewith, a manually adjustable contact, a second contact adapted to be adjusted by the motor and to cooperate with the first contact to close said secondary circuit, and an electromagnet energizable by said secondary circuit for breaking the motor circuit at a point predetermined by the adjustment of the first mentioned contact.

12. A motor actuated page finder comprising a motor, an electric circuit for energizing said motor, a rotatably supported manually adjustable electric contact, a second rotatably supported electric contact adjustable by the motor, a secondary electric circuit adapted to be closed by the contacting of the two contacts at a point predetermined by the adjustment of the first mentioned contact, and an electric means energizable by the closing of the secondary circuit for breaking the motor circuit.

13. A motor actuated page finder comprising a group of rotatably supported electric contacts, each of said contacts representing a digit in a figure having a plurality of places, said contacts being manually adjustable, whereby the group of contacts may represent a desired number, a second group of rotatably supported electric contacts, each of said contacts representing one of a plurality of the digits in a figure and corresponding with a contact of the first group, a train of gears connecting the motor with the units place contact of the second group to drive it at a predetermined speed, a gear transmission of the ratio ten to one mechanically connecting each contact with the next higher place contact, a second electric circuit, said circuit being closed by the closing of all corresponding pairs of contacts in the two groups, and an electric means energizable by said secondary circuit for breaking the motor circuit at a point predetermined by the adjustment of the first group of contacts.

14. A motor actuated page finder comprising a motor, an electric circuit to energize said motor, a group of rotatably mounted electric contacts, each of said contacts representing one digit of a number having a plurality of places, said contacts being manually adjustable so that the group may be adjusted to represent any desired number, a second group of rotatably mounted contacts, each contact of said second group corresponding to a contact of the first group, a train of gears between the motor and the contact representing the "units" place in the second group, a gear transmission having a ratio of ten to one between and mechanically connecting each contact of the second group with the contact representing the next higher place in said group, the corresponding pairs of contacts in the two groups being arranged in series and adapted to be closed in turn, starting with the pair representing the highest place, an electric resistance arranged to be cut in into the motor circuit upon the closing of a predetermined number of said pairs of contacts, and an electric means being energized upon the closing of all of said pairs of contacts for breaking the motor circuit.

15. A motor actuated page finder comprising a motor, an electric circuit to energize said motor, a group of rotatably mounted electric contacts, each contact in said group representing one digit of a figure having a plurality of places, each contact being manually adjustable to represent the numerals from 0 to 9 in one place whereby any desired number may be represented by the adjustment of said contacts, a second group of rotatably mounted electric contacts, each contact of this group corresponding and adapted to cooperate with a contact of the first group, a gear train connecting the motor with the contact representing the units place in the second group to rotate said contact at a predetermined speed, a gear transmission of the ratio ten to one between and mechanically connecting each contact of the second group with the contact representing the next higher place of the same group, the corresponding pairs of contacts of the two groups being arranged in series and to be closed in rotation starting with the pair representing the highest place, a plurality of resistances adapted to be cut in into the motor circuit successively, one by one, upon the closing of certain of said pairs of corresponding contacts at predetermined points and an electric means energizable by the closing of all of said corresponding pairs of contacts for breaking the motor circuit.

16. A motor actuated page finder comprising a motor, an electric circuit to energize said motor, a selector group of rotatably mounted, manually adjustable dials, each selector dial representing one digit of a number having a plurality of places and visibly carrying the numerals from 0 to 9, so that any desired number may be set up on said group of dials, an electric contact connected with each of said dials, whereby each contact will be adjusted simultaneously with the corresponding dial, an indicator group of rotatably mounted dials, each dial of the indicator group corresponding with a dial of the selector group, the dial of the indicator group representing the units column being driven by said motor, a gear transmission of the ratio ten to one connecting each of the indicator dials of the indicator group with the dial representing the next higher place in said indicator group, an electric contact for and connected with each of the dials of the indicator group, rotating therewith and adapted to contact the corresponding contact of the selector group, the pairs of corresponding contacts being arranged in series so that they will be closed one by one beginning with the pair of contacts representing the highest place, and an electric means being energized upon the closing of all pairs of corresponding contacts for breaking the motor circuit at a point predetermined by the manual adjustment of the selector group of contacts.

17. A motor actuated page finder comprising a motor, an electric circuit to energize said motor, a selector group of rotatably mounted dials, each dial representing one digit of a number having a plurality of places and visibly carrying the numerals from 0 to 9, so that any desired number may be set up on said dials, an electric contact attached to each of said selector dials so that each contact will be adjusted simultaneously with its dial, a second indicator group of rotatably mounted dials, each dial of said indicator group corresponding with a dial of the selector group, a train of gears connecting the motor with the dial representing the units place in said indicator group of dials to drive said dial at a predetermined speed, gear transmissions of the ratio ten to one connecting adjacent dials of the indicator group, an electric contact attached to and rotating with each of the dials of the indicator group and adapted to contact the contact of the corresponding dial of the selector group, the pairs of corresponding contacts being arranged so that they will be closed successively at predetermined intervals starting with the pair representing the highest place, a resistance adapted to be cut in into the motor circuit after certain pairs of corresponding contacts have been closed and an electric means energizable upon the closure of all pairs of contacts for breaking the motor circuit at a point predetermined by the adjustment of the selector group of dials.

18. A motor actuated page finder comprising a motor, an electric circuit to energize said motor, a selector group of rotatably mounted, manually adjustable dials, each dial representing one place in a number having a plurality of places and visibly carrying the numerals from 0 to 9 so that any desired number may be set up or selected on said dials, an electric contact attached to each dial so that each contact will be adjusted simultaneously with the corresponding dial, a second indicator group of rotatably mounted dials, each dial of said second indicator group corresponding with a dial of the first selector group, a train of gears connecting the motor with the dial representing the units place in said indicator group of dials to drive said dial at a predetermined speed, a gear transmission of the ratio ten to one connecting each dial of the indicator group with the dial representing the next higher place in the same group, an electric contact attached to and rotating with each of the dials of the indicator group and adapted to contact the contact of the corresponding dial of the selector group, the pairs of corresponding contacts being arranged so that they will be closed successively, starting with the pair representing the highest place, at predetermined intervals, a plurality of resistances adapted to be cut in into the motor circuit, one by one, upon the closing of certain of the pairs of corresponding contacts to reduce the speed of the motor, step by step, and an electric means energizable upon closure of all pairs of corresponding contacts for breaking the motor circuit.

19. A motor actuated page finder comprising a motor, an electric circuit to energize said motor, a housing, a selector group of vertical shafts journaled in said housing, a selector dial mounted on each of said shafts for rotation therewith, means for manually rotating said shafts and thereby adjusting said dials, each of said dials representing one place in a number having a plurality of places and visibly carrying the numerals from 0 to 9, an electric contact attached to each of said shafts and simultaneously rotatable therewith, means for transmitting rotary movement at the ratio ten to one from a shaft to the electric contact mounted on the next higher place shaft independently of the shaft upon which said contact is mounted, a second indicator group of vertical shafts journaled in said housing, each shaft of said second indicator group being arranged coaxially above a corresponding shaft of the first selector group, a train of gears connecting the motor with the units shaft of the second indicator group to drive said shaft at a predetermined speed, a gear transmission of the ratio ten to one connecting each shaft of the second indicator group with the next higher place shaft of the same group, an electric contact fastened to each of the shafts of the second indicator group, rotatable therewith and adapted to contact the contact on the corresponding shaft of the first selector group, the pairs of corresponding contacts being arranged in series for being closed successively starting with the pair representing the highest place, a plurality of resistances adapted to be cut in into the motor circuit, one by one, upon the closing of certain pairs of corresponding contacts whereby the speed of the motor is reduced, step by step, at predetermined intervals, and an electric means energizable upon closure of all pairs or contacts for breaking the motor circuit at a point predetermined by the adjustment of the contacts on the first group of shafts.

20. A motor actuated page finder comprising a motor, an electric circuit to energize said motor, a housing, a selector group of vertical shafts journaled in said housing, a selector dial mounted on each of said shafts for rotation therewith, means for manually rotating said shafts and thereby adjusting said dials, each of said selector dials representing one place in a number having a plurality of places and visibly carrying the numerals from 0 to 9, an electric contact attached to each of said shafts and simultaneously rotatable therewith, means for transmitting rotary movement at the ratio 10 to 1 from a shaft to the electric contact mounted on the next higher place shaft independently of the shaft upon which said contact is mounted, means for holding the selector dials and the selector shafts thereof against movement with said contacts, a second indicator group of vertical shafts journaled in said housing, each shaft of said second indicator group being arranged coaxially above a corresponding shaft of the first selector group, a train of gears connecting the motor with the shaft of the second indicator group located above the shaft of the units place in the first selector group to drive said indicator shaft at a predetermined speed, a gear transmission, of the ratio ten to one, connecting each shaft of the second indicator group with the shaft of the same group located over the selector shaft of the next higher denomination in the first selector group, an electric contact attached to each of the indicator shafts of the second indicator group, rotatable therewith and adapted to contact the contact on the corresponding selector shaft of the first selector group, the pairs of corresponding contacts being arranged in series for being closed successively starting with the pair representing the highest place, a plurality of resistances adapted to be cut in into the motor circuit, one by one, upon the closing of certain pairs of corresponding contacts whereby the speed of the motor is reduced, step by step, at predetermined intervals, and an electric means energizable upon closure of all pairs of contacts for breaking the motor circuit at a point predetermined by the adjustment of the contacts on the first group of shafts.

21. A motor actuated page finder comprising a motor, an electric circuit to energize said motor, a housing, a selector group of shafts vertically journaled in said housing, selector dial mounted on each of said shafts for rotation therewith, means for manually rotating each of said selector shafts independently of the others and thereby adjusting the selector dials, each dial of said selector group representing one place in a number having a plurality of places and visibly carrying the numerals from 0 to 9 thereon, so that any desired number may be set up in said selector dials, an electric contact attached to each of said selector shafts for rotation therewith, means for securing each selector dial and its selector shaft against other rotation than that caused by the means for manually rotating each of said shafts, means to transmit rotary movement of said lower place shaft at the ratio ten to one, to said contact mounted on the next higher place shaft, independently of the higher place shaft, a second indicator group of shafts vertically journaled in the housing and located coaxially above the selector shafts of the first selector group, a train of gears between the motor and the indicator shaft of the second indicator group located above the selector shaft of the units place of the first selector group to drive said indicator shaft of the second indicator group at a predetermined speed, gear transmissions of the ratio ten to one connecting each indicator shaft of a lower place in the second indicator group with the indicator shaft of the next higher place in the indicator group, an electric contact fastened to each of the indicator shafts of the indicator group, rotatable therewith and adapted to contact the contact on the corresponding selector shaft of the first selector group, the pairs of corresponding contacts being arranged in series for being closed successively starting with the pair representing the highest place, a plurality of resistances adapted to be cut in into the motor circuit, one by one, upon the closing of certain pairs of contacts whereby the speed of the motor is reduced, step by step, at predetermined intervals, and an electric means energizable upon closure of all pairs of contacts for breaking the motor circuit at a point predetermined by the adjustment of the contacts of the first group.

22. In a device for locating and displaying a desired portion of a coiled tape, a motor for unwinding said tape, means for operating said motor at varying speeds, variably operable means for predetermining the length of tape to be unwound by said motor, and means automatically operated before the complete predetermined length of tape has been unwound for changing the speed of said motor.

RUPERT H. DRAEGER.